Jan. 17, 1939.   H. P. BASSETT ET AL   2,144,213
MECHANISM FOR EXTRUDING PLASTIC MATERIALS
Filed Oct. 5, 1936
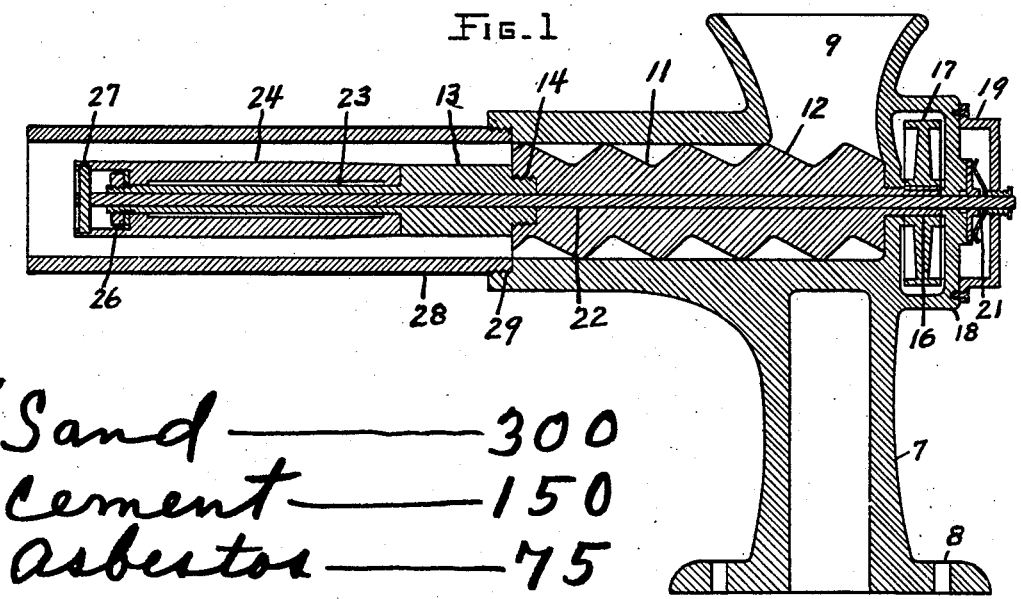
Sand ——— 300
cement ——— 150
asbestos ——— 75
clay ——— 7
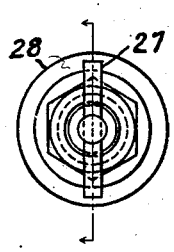
Fig.3
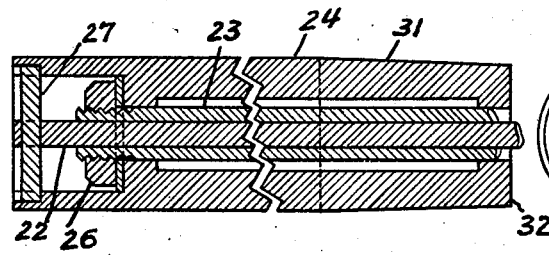
Fig.2
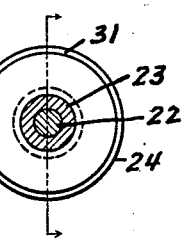
Fig.4
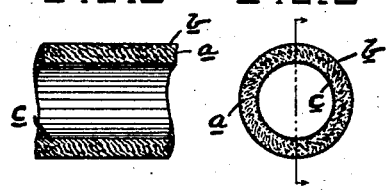
Fig.5  Fig.6
INVENTOR
EDWARD B. EDWARDS AND
HARRY P. BASSETT
BY
ATTORNEY Patented Jan. 17, 1939

2,144,213

UNITED STATES PATENT OFFICE 2,144,213

MECHANISM FOR EXTRUDING PLASTIC MATERIALS

Harry P. Bassett, Cynthiana, Ky., and Edward B. Edwards, Lansdale, Pa., assignors to Edwards, Inc., Wilmington, Del., a corporation of Delaware Application October 5, 1936, Serial No. 104,048

7 Claims. (Cl. 25—14)

This invention relates to the extrusion of plastic materials and has particular reference to the extrusion of articles such as conduits, and in which no deformation of same will take place as it comes from the die.

The primary object of the invention is to extrude hollow shapes which will retain their given shapes and substantially their dimensions when solidified.

A further object of the invention is to extrude hollow shapes in which the components will be compressed so as to give the minimum of voids and in which the interiors and exteriors will be substantially smooth.

A still further object of the invention is to provide an article having fibrous material as a component thereof and in which the material tends to extrude spirally.

Another object of the invention is to produce an article having fibrous material as one of its components and in which the body fibers thereof follow the spiral line of extrusion so as to be oriented in such direction and in which at least one of the surfaces will have the fiber direction changed.

A still further object is to provide mechanism for carrying out the above objects.

According to the invention, the machine comprises a feed member and a cylindrical forming die rotatable therewith and onto which the material is directly fed, and in which there is an outer member surrounding the die, and between which member and the die the material is compressed. The machine may be provided with a smoothing die which may be either stationary or rotating at slower speed than the forming die and this smoothing die may be slightly larger in diameter than the forming die.

The drawing illustrates an embodiment of a machine for carrying out the present invention and the views therein are as follows:

Fig. 1 is a longitudinal sectional view of the machine,

Fig. 2 is an enlarged longitudinal sectional view of the smoothing die, particularly showing its manner of retention, Fig. 3 is a front end view thereof, Fig. 4 is a rear end view thereof, Fig. 5 is a small longitudinal sectional view of a cylindrical conduit formed on the machine shown in Fig. 1, and Fig. 6 is a cross sectional view thereof.

The machine shown in Fig. 1 comprises a pedestal 7 which may have anchorage holes 8 and a hopper 9 leading into a feed chamber 11. In this feed chamber there is placed a feed screw 12 on the front end of which a forming die 13 is secured by a threaded portion 14.

The rear end of the screw 12 has a reduced part 16 to which may be secured drive means and in the present instance this is shown as a pulley 17 keyed thereto. This drive means is contained in a housing 18 to which is attached a bracket 19 having friction means 21 for governing rotation of a shaft 22 extending entirely through said screw 12 and die 13. This forming die may have a reduced cylindrical part 23 onto which there is fitted a smoothing die 24 with end thrust control means 26 and with key means 27 for securing this smoothing die to the shaft 22 so that if the friction means 21 is so arranged the shaft 22 and smoothing die 24 will remain stationary.

Of course, the friction means may be so arranged that this smoothing die 24 may rotate but its purpose is, even when rotating, to make its speed of rotation less than the speed of rotation of the forming die 13.

Surrounding the forming die 13 and smoothing die 24 is an outer forming member 28 secured to the wall of the feed chamber 12, as at 29, and this member may extend some distance forward of the end of the smoothing die 24. In the present instance, this member has been shown as tubular in shape, but the invention is not limited to this or any other shape.

Material to be extruded is fed into the hopper 9 where it is taken by the screw 12 and passed onto the forming die 13 and between that die and the member 28 where it is highly compressed. The smoothing die 24 shown in an enlarged view, Fig. 2, has a tapered end 31 rising from its forward end 32 which is of the same diameter as the forming die 13 and this taper is in most instances very slight, ordinarily not being more than from three to fifteen thousandths of an inch.

Material to be extruded by the mechanism here shown may be of various types, and as an example of one material for the purpose of making conduits for a specific purpose, the following ingredients have been used:—

|  | Pounds |
|---|---|
| As a temporary binder, a colloid, such as clay | 7 |
| Fibrous material, such as asbestos | 75 |
| Permanent binder, such as cement | 150 |
| A filler, such as sand | 300 |
| Water in sufficient quantity to combine the foregoing materials. | |

The operation of the machine is as follows: When the material is being fed by the screw 12, the fibers in the same will be oriented in the direction of the feed and when the material passes between the forming die 13 and member 28, the fibers of the outer surface, that is the surface coming in contact with the member 28, will have their directions changed if the member is stationary.

In Figs. 5 and 6, the body fibers are indicated by the characteristic *a* while the outer fibers of the surface coming in contact with the member 28 are indicated by the characteristic *b*. Now again, if the smoothing die 24 is either stationary or rotating at slower speed than the forming die 13, the surface fibers of the inner face will have their direction changed as indicated by the characteristic *c*.

It is, of course, understood that the section extruded by this mechanism will produce articles homogeneous as to their chemical characteristics, but the fiber directions of the body of the section and the surfaces may have their directions changed and, therefore, the section produced will be strengthened thereby.

The section, furthermore, will be extruded spirally, that is to say, the action of the feed screw on the rotating die 13 will cause the spiral formation of the components of the material being extruded, and this same action will still obtain even though the material continues to pass between a stationary smoothing die 24 and a stationary member 28.

In the extrusion of a conduit of approximately five inch outside diameter and four inch inside diameter, it has been found that the resulting conduit has one convolution of a spiral to about three and one-half feet of its length.

Of course the plastic material to be extruded must be of such a nature that it will retain its physical shape when it has emerged from the front of the member 28, and it follows that the extruded sections may be cut into desired lengths after formation.

The machine illustrated in the drawing is merely an exemplification of mechanisms for carrying out the invention and both this mechanism and the materials to be extruded as well as the article produced may be modified and changed in various ways without departing from the invention herein set forth and hereafter claimed.

The invention is hereby claimed as follows:—

1. A machine for extruding hollow sections comprising a feed member, a rotary cylindrical forming die positioned adjacent to the outer end of the feed member to receive the material fed by the feed member, means for rotating said die, a smoothing die adjacent the outer end of said forming die and axially aligned therewith, said forming die having rotatable relation to said smoothing die, said feed member adapted to feed the material directly onto said forming die, and an outer forming member having a uniform cross section surrounding said forming die and smoothing die.

2. A machine for extruding hollow sections comprising a feed screw, a rotary cylindrical forming die positioned adjacent to the outer end of the feed screw to receive the material fed by the feed screw, means for rotating said die, a smoothing die adjacent the outer end of said forming die and axially aligned therewith, said forming die having rotatable relation to said smoothing die, said feed screw adapted to feed the material directly onto said forming die, and an outer forming member having a uniform cross section surrounding said forming die and smoothing die.

3. A machine for extruding hollow sections comprising a feed member, a rotary cylindrical forming die rotating with and positioned adjacent to the outer end of the feed member to receive the material fed by the feed member, means for rotating said die, a smoothing die adjacent said forming die and axially aligned therewith, said forming die having rotatable relation to said smoothing die, said feed member adapted to feed the material directly onto said forming die, and an outer forming member having a uniform cross section surrounding said forming die and smoothing die.

4. A machine for extruding hollow sections comprising a feed member, a rotary cylindrical forming die positioned adjacent to the outer end of the feed member to receive the material fed by the feed member, means for rotating said die, a stationary smoothing die adjacent said forming die and axially aligned therewith, said feed member adapted to feed the material directly onto said forming die, and an outer forming member having a uniform cross section surrounding said forming die and smoothing die.

5. A machine for extruding hollow sections comprising a feed member, a rotary cylindrical forming die positioned adjacent to the outer end of the feed member to receive the material fed by the feed member, means for rotating said die, a smoothing die adjacent the outer end of said forming die and axially aligned therewith, said forming die having rotatable relation to said smoothing die, one of said dies having a portion tapering to larger diameter in the direction of movement of the material, said feed member adapted to feed the material directly onto said forming die, and an outer forming member having a uniform cross section surrounding said forming die and smoothing die.

6. A machine for extruding hollow sections comprising a feed member, a rotary cylindrical forming die positioned adjacent to the outer end of the feed member to receive the material fed by the feed member, means for rotating said die, a smoothing die adjacent the outer end of said forming die and axially aligned therewith, said forming die having rotatable relation to said smoothing die, said smoothing die having a portion tapering to larger diameter in the direction of movement of the material, said feed member adapted to feed the material directly onto said forming die, and an outer forming member having a uniform cross section surrounding said forming die and smoothing die.

7. A machine for extruding hollow sections comprising a feed screw, a rotary cylindrical forming die positioned adjacent to the outer end of the feed member to receive the material fed by the feed member, means for rotating said die, a stationary smoothing die adjacent said forming die and having its adjacent end of substantially the same diameter as the forming die, a portion tapering to larger diameter from said adjacent end, said smoothing die being axially aligned with said forming die, and an outer forming member having a uniform diameter surrounding said forming die and smoothing die.

HARRY P. BASSETT.
EDWARD B. EDWARDS.